US012791659B2

(12) United States Patent
Bal et al.

(10) Patent No.: US 12,791,659 B2
(45) Date of Patent: Nov. 10, 2026

(54) METHOD AND APPARATUS FOR REDUCING STORAGE FOR PROPORTIONAL DATA

(71) Applicant: STMicroelectronics International N.V., Geneva (CH)

(72) Inventors: Ankur Bal, Greater Noida (IN); Vikram Singh, Radaur (IN)

(73) Assignee: STMICROELECTRONICS INTERNATIONAL N.V., Geneva (CH)

( * ) Notice: Subject to any disclaimer, the term of this patent is extended or adjusted under 35 U.S.C. 154(b) by 260 days.

(21) Appl. No.: 18/521,570

(22) Filed: Nov. 28, 2023

(65) Prior Publication Data

US 2024/0192314 A1 Jun. 13, 2024

Related U.S. Application Data

(60) Provisional application No. 63/386,521, filed on Dec. 8, 2022.

(51) Int. Cl.
*G01S 7/35* (2006.01)

(52) U.S. Cl.
CPC .................................... *G01S 7/35* (2013.01)

(58) Field of Classification Search
CPC .................................................. G01S 7/35
See application file for complete search history.

(56) References Cited

U.S. PATENT DOCUMENTS 6,424,184 B1 * 7/2002 Yamamoto ............. G01R 23/06 327/158
9,791,834 B1 * 10/2017 Nassar .................. G04F 10/005
2003/0160713 A1 * 8/2003 Kuyel ................. H03M 1/1047 341/120
2009/0195321 A1 * 8/2009 Saunders .............. G01S 7/4008 331/17
2013/0088302 A1 * 4/2013 Wu ......................... H03L 7/099 331/175
2017/0023663 A1 * 1/2017 Subburaj ................ G01S 7/036

* cited by examiner

*Primary Examiner* — Vladimir Magloire
*Assistant Examiner* — Ismaaeel A. Siddiquee
(74) *Attorney, Agent, or Firm* — Alston & Bird LLP

(57) ABSTRACT

An apparatus, method, and system for efficiently storing proportional data is provided. An example apparatus may include a controller configured to determine a linear estimate based on input values provided to a first circuit and proportional output values received from the first circuit. The input values include a first input value proportional to a first output value and a second input value proportional to a second output value. Further, the linear estimate of the output values may be determined based on the first output value and a linear rate of change, wherein the linear rate of change corresponds to the change from the first input value to the second input value and the change from the first output value to the second output value. The apparatus may further comprise a memory, configured to store a storage value that represents an offset of an output value from the linear estimate.

20 Claims, 7 Drawing Sheets

METHOD AND APPARATUS FOR REDUCING STORAGE FOR PROPORTIONAL DATA

CROSS-REFERENCE TO RELATED APPLICATIONS

This application claims the benefit of U.S. Provisional Patent Application No. 63/386,521, filed Dec. 8, 2022, the entire contents of which are hereby incorporated by reference in their entirety.

TECHNOLOGICAL FIELD

Embodiments of the present disclosure relate generally to storage of proportional data, and more particularly, to reducing the required storage capacity for proportional data on an electronic device.

BACKGROUND

Proportional data may take the form of any data set for which an output value changes based on a provided input value. Many electronic devices perform an operation and/or update internal components based on receive input values resulting in an updated output value. In such a system, the resulting output value is proportional to the received input value. There are numerous example scenarios in which it may be beneficial to save such proportional data for quick access during run-time operation.

For example, a voltage-controlled oscillator (VCO) is an oscillating circuit whose oscillation frequency (output value) varies based on a supplied input voltage (input value). In some examples, a VCO may be utilized to generate a signal having a precise output frequency, for example, as part of a radar system. A controller may adjust the input voltage supplied to the VCO by transmitting an input value correlated with the desired output frequency.

To select an appropriate input value to produce the desired output frequency, a controller may perform an initialization process in which the controller transmits each valid input value, or a subset of valid input values, to the VCO. In some examples, the controller may record the returned output value in a memory device, such as a look-up table (LUT), at a location associated with the transmitted input value. A LUT may allow a controller to access the stored output value correlated with the input value by directly using the input value as the memory address. Thus, during operation, a controller may select an input value to input based on the desired output value.

Some example devices may seek to limit or reduce the size of the memory devices on the electronic device. In some examples, the resources allocated to memory devices may add to the overall cost of the electrical device, increase the power consumption, and increase the size of the electronic device. Applicant has identified many technical challenges and difficulties associated with the storage required for storing proportional data on an electronic device. Through applied effort, ingenuity, and innovation, Applicant has solved problems related to the required size of a memory device for storing proportional data by developing solutions embodied in the present disclosure, which are described in detail below.

BRIEF SUMMARY

Various embodiments are directed to example methods, apparatus, and systems for storing proportional data on an electronic device such that the required size of the memory may be reduced.

In accordance with some embodiments of the present disclosure, an example apparatus is provided. In some embodiments, the apparatus may comprise a controller configured to generate a linear rate of change and a linear estimate based on a plurality of input values provided to a first circuit and a plurality of output values proportional to the plurality of input values received from the first circuit. In addition, the plurality of input values may comprise at least a first input value proportional to a first output value and a second input value proportional to a second output value. Further, the linear rate of change may be determined based at least in part on the change from the first input value to the second input value and on the change from the first output value to the second output value. Also, the linear estimate of the plurality of output values may be determined based at least in part on the first output value and the linear rate of change. The apparatus may further comprise a memory, configured to store a storage value that represents an offset of the output value from the linear estimate.

In some embodiments, the first circuit may comprise a voltage-controlled oscillator and the plurality of input values may correspond to a plurality of input voltages.

In some embodiments, the voltage-controlled oscillator may be further configured to generate an output signal comprising an output frequency, wherein the plurality of output values are proportional to the output frequency of the output signal.

In some embodiments, the first input value may correspond to an input value of the plurality of input values comprising a lowest input voltage, and the second input value may correspond to an input value of the plurality of input values comprising a highest input voltage.

In some embodiments, the plurality of output values monotonically increase as the input value increases.

In some embodiments, the linear estimate may comprise the line that passes through a point representing the first input value and proportional first output value and comprising a slope correlated to the linear rate of change.

In some embodiments, the number of bits required to store the storage value may be less than the number of bits required to store the output value.

An example method is further provided. In some embodiments, the method may comprise, for each input value in a plurality of input values comprising at least a first input value and a second input value: (1) transmitting the input value to a first circuit, wherein the first circuit is configured to generate an output value based at least in part on the input value, and (2) receiving an output value proportional to the input value. In addition, the method may comprise determining a linear rate of change based at least in part on the change from the first input value to the second input value and on the change from a first output value proportional to the first input value to a second output value proportional to the second input value. Further, the method may comprise determining a linear estimate of the plurality of output values based at least in part on the first output value and the linear rate of change. The method may further comprise for each input value in the plurality of input values: (1) computing a storage value representing the offset of the proportional output value from the linear estimate for the proportional input value, and (2) storing the storage value in a memory at a location representing the proportional input value.

In some embodiments, the first circuit may comprise a voltage-controlled oscillator and the plurality of input values may correspond to a plurality of input voltages.

In some embodiments, the voltage-controlled oscillator may further be configured to generate an output signal comprising an output frequency, wherein the plurality of output values correlate to the output frequency of the output signal.

In some embodiments, the first input value may correspond to an input value of the plurality of input values comprising the lowest input voltage, and the second input value may correspond to an input value of the plurality of input values comprising the highest input voltage.

In some embodiments, the plurality of output values may monotonically increase as the input value increases.

In some embodiments, the linear estimate may comprise the line that passes through the first input value and proportional first output value with a slope correlated to the linear rate of change.

In some embodiments, the number of bits required to store the storage value may be less than the number of bits required to store the output value.

An example radar system is further provided. In some embodiments, the radar system may comprise a phase-locked loop comprising a first circuit configured to receive an input value and generate an output value proportional to the input value. The radar system may further comprise a controller, configured to provide a plurality of input values to the first circuit and receive a plurality of output values proportional to the plurality of input values, wherein the plurality of input values comprise at least a first input value proportional to a first output value and a second input value proportional to a second output value. In addition, a linear rate of change may be determined based at least in part on the change from the first input value to the second input value and on the change from the first output value to the second output value. Further, a linear estimate of the plurality of output values may be determined based at least in part on the first output value and the linear rate of change. In some embodiments, the radar system may further comprise a memory, configured to store a storage value proportional to each of the plurality of input values, wherein, each storage value represents the offset of the output value from the linear estimate for the corresponding input value.

In some embodiments, the radar system may further comprise a local oscillator electrically connected to the phase-locked loop, wherein the phase-locked loop generates an output signal based at least in part on a reference signal generated by the local oscillator. In addition, the radar system may comprise a transmit amplifier electrically connected to the phase-locked loop, wherein the transmit amplifier generates an amplified output signal based at least in part on the output signal. Further, the radar system may comprise a transmit antenna electrically connected to the transmit amplifier, wherein the transmit antenna transmits a transmitted signal based at least in part on the amplified output signal. Additionally, the radar system may comprise a receive antenna configured to receive a reflected signal resulting from one or more objects encountered by the transmitted signal. The radar system may also comprise a receive amplifier electrically connected to the receive antenna, wherein the receive amplifier is configured to generate an amplified receive signal based at least in part on the reflected signal. The radar system may further comprise, a mixer electrically connected to the phase-locked loop and the receive amplifier, wherein the mixer is configured to produce a mixed signal based at least in part on the output signal and the amplified receive signal. Further, the radar system may comprise a receive filter electrically connected to the mixer, wherein the receive filter is configured to generate a filtered signal based at least in part on the mixed signal. The radar system may also comprise a processor electrically connected to the receive filter, wherein the processor determines one or more characteristics of the one or more objects based at least in part on the filtered signal.

In some embodiments, the first circuit may comprise a voltage-controlled oscillator and the plurality of input values may correspond to a plurality of input voltages.

In some embodiments, the voltage-controlled oscillator may be further configured to generate an output signal comprising an output frequency, wherein the plurality of output values are proportional to the output frequency of the output signal.

In some embodiments, the first input value may correspond to an input value of the plurality of input values comprising a lowest input voltage, and the second input value may correspond to an input value of the plurality of input values comprising a highest input voltage.

In some embodiments, the linear estimate may comprise the line that passes through a point representing the first input value and proportional first output value and comprising a slope correlated to the linear rate of change.

BRIEF DESCRIPTION OF THE DRAWINGS

Reference will now be made to the accompanying drawings. The components illustrated in the figures may or may not be present in certain embodiments described herein. Some embodiments may include fewer (or more) components than those shown in the figures in accordance with an example embodiment of the present disclosure.

DETAILED DESCRIPTION

Figure 1:
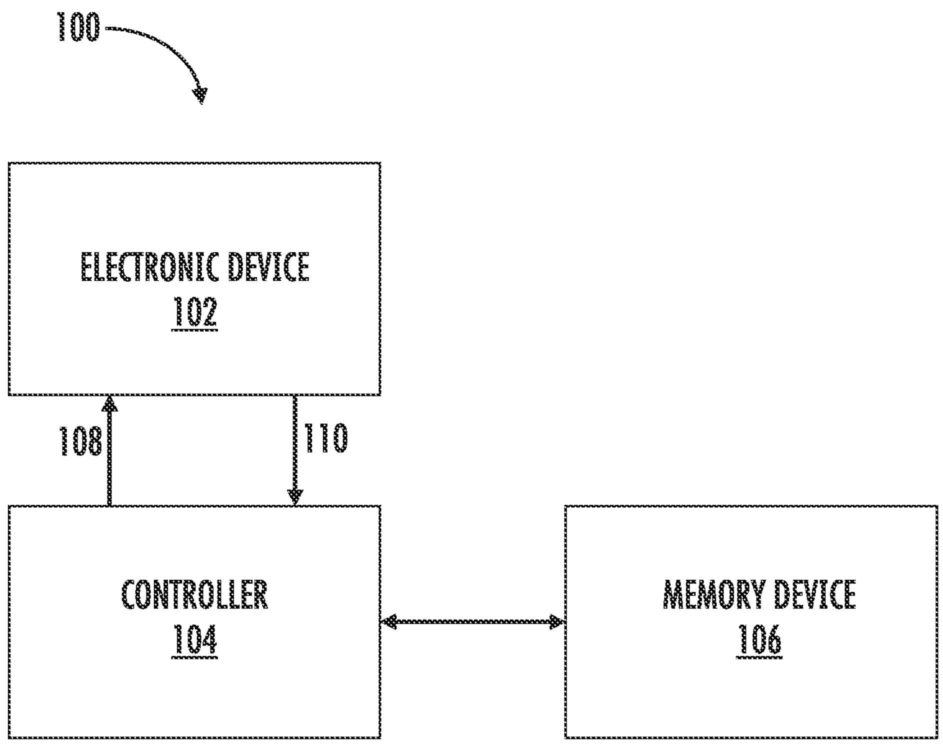
FIG. 1 illustrates a block diagram of an example electronic system in accordance with an example embodiment of the present disclosure.

Example embodiments will be described more fully hereinafter with reference to the accompanying drawings, in which some, but not all embodiments of the inventions of the disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

Various example embodiments address technical problems associated with storing proportional data in a memory device such that the storage size and subsequent area of the memory device may be reduced. As understood by those of skill in the field to which the present disclosure pertains, there are numerous example scenarios in which it may beneficial to reduce the overall size of a memory device when dealing with proportional data.

Proportional data may take the form of any data set for which an output data value changes based on the input data value provided. For example, a voltage-controlled oscillator (VCO) may generate a signal with varying frequency based on an input voltage. Thus, the frequency of the output signal is an output data value proportional to the input voltage, or input data value. In some examples and during configuration of a PLL having a voltage-controlled oscillator (VCO), a controller may incrementally step through the range of possible input data values and record the returned digital output data value corresponding to the frequency of the generated output signal. The controller may then write the returned output data value to a location in a look-up table (LUT) corresponding to the input data value. Populating a LUT in this manner allows the controller to configure the VCO to generate an output signal having specific physical properties while in operation. For example, the controller may configure the VCO to generate a signal having a specific frequency by referencing the LUT and choosing the input data value corresponding to the desired output frequency.

One approach that has been used for storing the proportional data in a LUT is to store the actual output data value at a location in the LUT corresponding to the input data value. In some embodiments, the actual output data value may be a 16-bit or larger digital code. In an instance in which the actual output data value is stored for each input data value (e.g., 128 input codes) and for each frequency band (e.g., 16 frequency bands) the storage capacity to store the actual output data values can become significant. Requiring more bits to store the actual output data values increases the physical area occupied by the LUT/LUTs. In addition, more electrical components (e.g., flip-flops) are necessary to store the proportional data. The increased area not only increases the physical size but also increases the cost to produce the electrical device. In addition, each of the increased number of electrical components can contribute to power leakage causing the electrical device to consume more power. An inability to reduce the size of the LUT may also limit the flexibility of the overall architecture of the electronic device with regards to size and weight. Further, a LUT comprising a larger number of electrical components may have a slower response time then a LUT with a smaller number of electrical components. Thus, there is a need for improving the way proportional data is stored in a memory device.

The various example embodiments described herein utilize various techniques to reduce the physical size and number of electrical components of a LUT in an instance in which a LUT is used to store proportional data. For example, in an example embodiment in which control circuitry may be utilized to calibrate a PLL comprising a VCO or similar electronic device, the control circuitry may sweep through the range of valid input data values and determine and/or receive an output data value proportional to each of the input data values. During and/or after receiving the output data values, the control circuitry may determine a linear rate of change that may approximate the change in the output data values with respect to the input data values. In some embodiments, the control circuitry may determine a linear estimate of the output data values based on the input data values by determining a line that passes through a first data point (e.g., the first input data value and proportional first output data value) and a second data point (e.g., the last input data value and proportional last output data value).

Instead of storing the actual output data value, the controller may then determine a storage value. In some embodiments, the storage value may be an offset value indicating an offset between the actual output data value and the estimated output data value determined from the linear estimate of the output data values. Storing the offset value, as opposed to the actual output data value, may, in some examples, provide a significant reduction in the number of bits required to determine the actual output data value given an input data value during operation. For example, during operation, to determine the actual output data value, the control circuitry may first calculate the estimated output data value given the linear estimate and the input data value and then use the stored offset value to determine the actual output data value. Storing the output data values as described may provide for significant reductions in the storage capacity required to determine the actual output data values. In addition, the storage technique described does not compromise precision when determining actual output data values. Further, the extra computation required to recover the stored code is insignificant.

As a result of the herein described example embodiments and in some examples, the storage requirements for LUTs utilized to store proportional data may be greatly reduced. For example, by storing the offset value, as opposed to the output data value, the area required for storing the proportional data may be reduced in some instances by more than 25% depending on the bit size and linearity of the stored data. The resulting reduction in LUT size may further lead to savings in power and manufacturing cost, as well as improvements in the speed of the electronic device.

Referring now to FIG. 1 a block diagram of an example electronic system 100 in accordance with an example embodiment of the present disclosure is provided. As depicted in FIG. 1, the example electronic system 100 includes an electronic device 102 communicatively connected to a controller 104. The depicted controller 104 transmits input data values 108 to the electronic device 102 and receives output data values 110 from the electronic device 102. Further, the controller 104 is communicatively connected to a memory device 106 where the input data values 108 and proportional output data values 110 may be stored.

Although components are described with respect to functional limitations, it should be understood that the particular implementations necessarily include the use of particular computing hardware. It should also be understood that in some embodiments certain of the components described herein include similar or common hardware. For example, two sets of circuitry may both leverage use of the same processor(s), network interface(s), storage medium(s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like.

As depicted in FIG. 1, the example electronic system 100 includes an electronic device 102. An electronic device 102 may be any hardware, software, firmware, and/or a combination thereof, that receives one or more input data values 108 and provides one or more output data values 110 proportional to the input data values 108. For example, the electronic device 102 may be a voltage-controlled motor, wherein the input data value 108 is a voltage and the output data value 110 is a rotational speed. As another example, the electronic device 102 may be a photodiode, wherein the input data value 108 is a light intensity, and the output data value 110 is a current. In some embodiments, a calibration may be performed to associate the input data values 108 with the output data values 110 and store the associations in a memory device 106.

As further depicted in FIG. 1, the example electronic system 100 includes a controller 104. The controller 104 may be any processor, circuitry, or similar device configured to execute instructions stored in a data storage media, memory, or device otherwise accessible to the controller 104. Alternatively or additionally, the controller 104 in some embodiments may be configured to execute hard-coded functionality. As such, whether configured by hardware or software methods, or by a combination thereof, the controller 104 represents an entity (e.g., physically embodied in circuitry) capable of performing operations according to an embodiment of the present disclosure while configured accordingly. Alternatively or additionally, as another example, in an instance in which the controller 104 is embodied as an executor of software instructions, the instructions specifically configure the controller 104 to perform the algorithms embodied in the specific operations described herein when such instructions are executed.

As one particular example embodiment, the controller 104 may be configured to perform various operations associated with determining the storage locations and storage values for the output data values 110. In addition, the controller 104 may, in some embodiments, determine the actual output data value based on the stored offset value. In some embodiments, the controller 104 includes hardware, software, firmware, and/or a combination thereof, that for each input value in a plurality of input values comprising at least a first input value and a second input value: (1) transmits the input value to a first circuit (e.g., electronic device 102), wherein the first circuit is configured to generate an output value based at least in part on the input value, and (2) receive an output value proportional to the input value. Additionally, or alternatively, in some embodiments, the controller 104 includes hardware, software, firmware, and/or a combination thereof, that determines a linear rate of change based at least in part on the change from the first input value to the second input value and on the change from a first output value proportional to the first input value to a second output value proportional to the second input value. Additionally, or alternatively, in some embodiments, the controller 104 includes hardware, software, firmware, and/or a combination thereof, that determines a linear estimate of the plurality of output values based at least in part on the first output value and the linear rate of change. Additionally, or alternatively, in some embodiments, the controller 104 includes hardware, software, firmware, and/or a combination thereof, that for each input value in the plurality of input values: (1) computes a storage value representing the offset of the proportional output value from the linear estimate of the output value for the correlated input value, and (2) stores the storage value in a memory at a location representing the correlated input value.

In some embodiments, the controller 104 further includes communications circuitry. The communications circuitry includes any means such as a device or circuitry embodied in either hardware or a combination of hardware and software that is configured to receive and/or transmit data from/to a network and/or any other device, circuitry, or module in communication with the controller 104. For example, in some embodiments, communication between the controller 104, electronic device 102, and/or memory device 106 may be supported by an inter-integrated circuit (I2C) communication channel.

As further depicted in FIG. 1, the example electronic system 100 includes a memory device 106. A memory device 106 may be any electronic storage device or system utilized to store data within the electronic system 100. In some embodiments, the memory device 106 may be non-transitory and may include, for example, one or more volatile and/or non-volatile memories. In some embodiments, the memory device 106 may be configured to store information, data, content, applications, instructions, or the like, for enabling the controller 104 to carry out various functions in accordance with example embodiments of the present disclosure.

Figure 2:
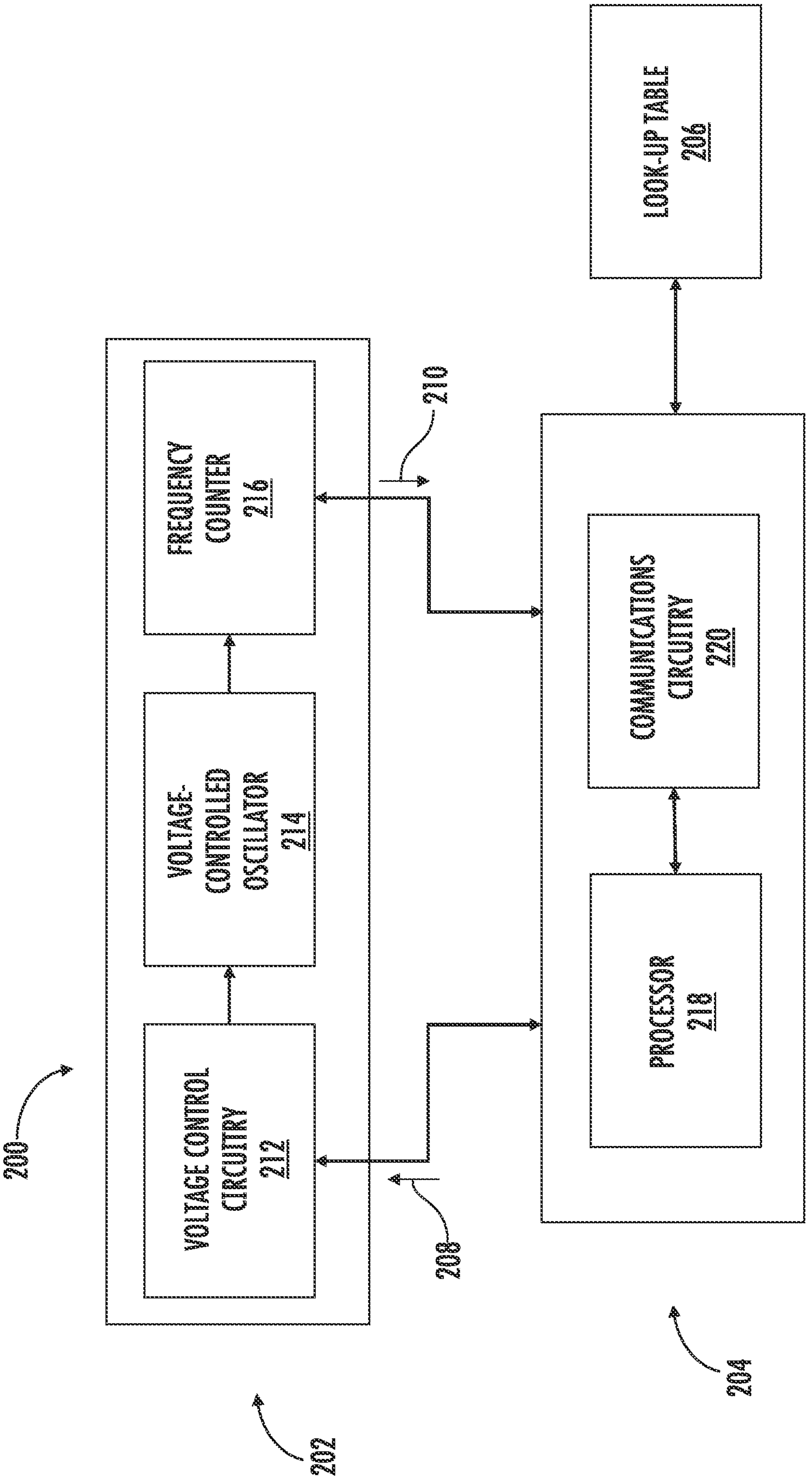
FIG. 2 illustrates an example block diagram of a voltage-controlled oscillator (VCO) device in accordance with an example embodiment of the present disclosure.

Referring now to FIG. 2, an example block diagram of an electronic system embodied as a VCO device 200 is provided. As depicted in FIG. 2, the example VCO device 200 includes VCO analog circuitry 202 communicatively connected to a controller 204. The communicative connection between the VCO analog circuitry 202 and the controller 204 may include a device control channel for transmitting data, such as input data values 208 from the controller 204 to the VCO analog circuitry 202, and a device status channel for receiving data, such as output data values 210 from the VCO analog circuitry 202 to the controller 204. Further, the controller 204 is communicatively connected to a LUT 206.

As further depicted in FIG. 2, the example VCO analog circuitry 202 further includes voltage control circuitry 212 electrically connected to a voltage-controlled oscillator (VCO) 214, which is in turn electrically connected to a frequency counter 216. Additionally, as further shown in FIG. 2, the controller 204 further includes a processor 218 and communications circuitry 220.

As depicted in FIG. 2, the example VCO device 200 includes VCO analog circuitry 202. The VCO analog circuitry 202 may comprise the analog components of the VCO device 200, including but not limited to the voltage control circuitry 212, a VCO 214, and a frequency counter 216. Although depicted as components of the VCO analog circuitry 202, one or more of the components of the VCO analog circuitry 202 may comprise one or more digital components.

The voltage control circuitry 212 may be any component of the VCO analog circuitry 202 that receives an input data value 208 on a device control channel and configures the input voltage provided to the VCO 214 based on the input value. The voltage control circuitry 212 may comprise various components, for example, voltage sources, variable resistors, voltage dividers, amplifiers, switches, capacitors, resistors, etc., to configure an input voltage to the VCO 214, based on the input value.

In some embodiments, the input data value 208 may comprise an input voltage indicating the input voltage to be provided to the VCO 214. In some embodiments, the input data value 208 may be a resistance, indicating a resistance value to be set on one or more variable resistors to alter the resistance within the voltage control circuitry 212 and subsequently the voltage provided to the VCO 214. In some embodiments, the input data value 208 may comprise a digital code. A digital code may be any digital value that may be utilized by the voltage control circuitry 212 to configure the input voltage provided to the VCO 214. For example, in some embodiments, the input data value 208 may comprise a 7-bit binary number. In such an embodiment, the voltage control circuitry 212 may comprise a digital-to-analog converter (DAC) to translate the digital input into one or more resistor and/or voltage inputs that may be utilized to configure the input voltage provided to the VCO 214. In some embodiments, the digital code may provide incremental steps through a range of valid input voltages to be provided to the VCO 214, such that the smallest binary value (e.g., 7'b0000000) is correlated with the lowest valid input value (e.g., −500 mV) and the largest binary value (e.g., 7'b1111111) is correlated with the highest valid input voltage (e.g., 500 mV).

As further depicted in FIG. 2, the example VCO analog circuitry 202 of the example VCO device 200 includes a VCO 214. A VCO 214 may be any circuitry, module, component, or other similar device that generates an output signal with a frequency that varies based on an input voltage. As depicted in FIG. 2, the VCO 214 may receive an input voltage from the voltage control circuitry 212 based on an input data value (e.g., input data value 208) or digital code. A VCO 214 may comprise resistors, capacitors, operational amplifiers, field-effect transistors (FETs), and other similar components to generate an output signal exhibiting an output frequency based on an input voltage. In some embodiments, the VCO 214 may comprise a linear or harmonic oscillator generating a sinusoidal waveform, while in some embodiments, the VCO 214 may comprise a relaxation oscillator, generating a sawtooth or triangular waveform.

As further depicted in FIG. 2, the example VCO analog circuitry 202 of the example VCO device 200 includes a frequency counter 216. A frequency counter 216 may be any circuitry, module, component, or other similar device that monitors the frequency of the output signal generated by the VCO 214 and produces an output data value 210 proportional to the frequency of the generated output signal. In some embodiments, the output data value 210 may be a digital representation of the frequency of the generated output signal. For example, the output data value 210 may be a binary number representing a floating-point number, such as 19.92 Gigahertz (GHz). In some embodiments, the output data value 210 may be a digital code or count that represents the relative frequency of the generate output signal. As shown in FIG. 2, the output data value 210 may be transmitted to the controller 204 on a device status channel.

As further depicted in FIG. 2, the example VCO device 200 includes a controller 204. The controller 204 may comprise processing, communication, memory, and other components of the VCO device 200, including but not limited to the processor 218, and the communications circuitry 220.

The processor 218, as depicted in FIG. 2, may be any processor, circuitry, or similar device configured to execute instructions stored in a data storage media, memory, or other location accessible to the processor 218. In some embodiments, the processor 218 may be configured to execute hard-coded functionality, for example, via hardware and/or firmware components.

As further depicted in FIG. 2, the example controller 204 of the example VCO device 200 includes communications circuitry 220. The communications circuitry 220 includes any means such as a device or circuitry embodied in either hardware or a combination of hardware and software that is configured to receive and/or transmit data from/to a network and/or any other device, circuitry, or module in communication with the controller 204. For example, in some embodiments, communication between the controller 204, the VCO analog circuitry 202, and/or the LUT 206 may be supported by an I2C communication channel, a serial peripheral interface (SPI) communication channel, a controller area network (CAN) communication channel, or other similar communication protocol.

As further depicted in FIG. 2, the example VCO device 200 may include a LUT 206. A LUT 206 may be any data structure or memory device implemented in software, firmware, hardware, and/or any combination thereof, that enables direct addressing of a memory location or otherwise saved data value. In some embodiments, a LUT 206 may enable direct accessing of stored data values by the processor 218. In such an embodiment, the processor 218 may write proportional data to the LUT 206, using a first value as the address location and storing the proportional value at that address location. For example, a processor 218 may transmit an input data value 208 (e.g., 0) to the VCO analog circuitry 202. The VCO analog circuitry 202 may utilize the input data value 208 to configure the input voltage to the VCO 214, thus defining the output frequency of the generated output signal. The frequency counter 216 may then output an output data value 210 (e.g., 20.06 GHz) proportional to the frequency of the generated output signal. In some embodiments, the controller 204 may utilize the input data value 208 as the location in the LUT 206 at which to store the output data value 210. For example, the controller 204 may store the binary representation of the output data value 210 (e.g., 20.06) at memory location 0 (the input data value 208) in the LUT 206. During operation, the controller 204 may directly access the output frequency associated with the input data value 208 (e.g., 0).

In some embodiments, the controller 204 may perform an initialization process to determine the output frequency associated with each possible input value to the VCO analog circuitry. In some embodiments, the VCO device 200 may support a plurality of frequency bands (e.g., 16 frequency bands). In addition, in some embodiments, the VCO analog circuitry 202 may accept a seven bit input data value 208 (128 possible values), each representing a different input voltage configuration, for each frequency band. During the initialization process, the processor 218 may cycle through each possible input data value 208 (e.g., 0 to 127) for a given band and transmit the input data value 208 to the voltage control circuitry 212 of the VCO analog circuitry 202 via a device control channel. The voltage control circuitry 212 may then determine an input voltage, based on the input data value 208 and update the input voltage provided to the VCO 214. In some embodiments, the frequency counter 216 may monitor the frequency of the generated output signal and return an output data value 210, proportional to the frequency of the generated output signal, to the controller 204, via a device status channel. In some embodiments, the controller 204 may store the output data value 210 representing the frequency of the generated output signal at the direct access memory location for the input data value 208 (e.g., 0). The controller 204 may repeat this process until the output data value 210 is determined for each input data value 208, creating a LUT 206, storing data, such as that displayed in Table 1 below.

TABLE 1

Example LUT table for VCO device

| INPUT DATA VALUE | OUTPUT DATA VALUE |
|---|---|
| 208 | 210 |
| 0 | 19.6900 |
| 1 | 19.6964 |
| 2 | 19.7028 |
| 3 | 19.7091 |
| 4 | 19.7155 |
| 5 | 19.7219 |
| . | . |
| . | . |
| . | . |
| 123 | 20.4745 |
| 124 | 20.4809 |
| 125 | 20.4872 |
| 126 | 20.4936 |
| 127 | 20.5000 |

In addition, in some embodiments, the controller 204 may repeat the above process for each frequency band supported by the VCO analog circuitry (e.g., 16 bands). In such an embodiment, a look-up table such as Table 1 would be created for each frequency band supported by the VCO analog circuitry 202.

Figure 3:
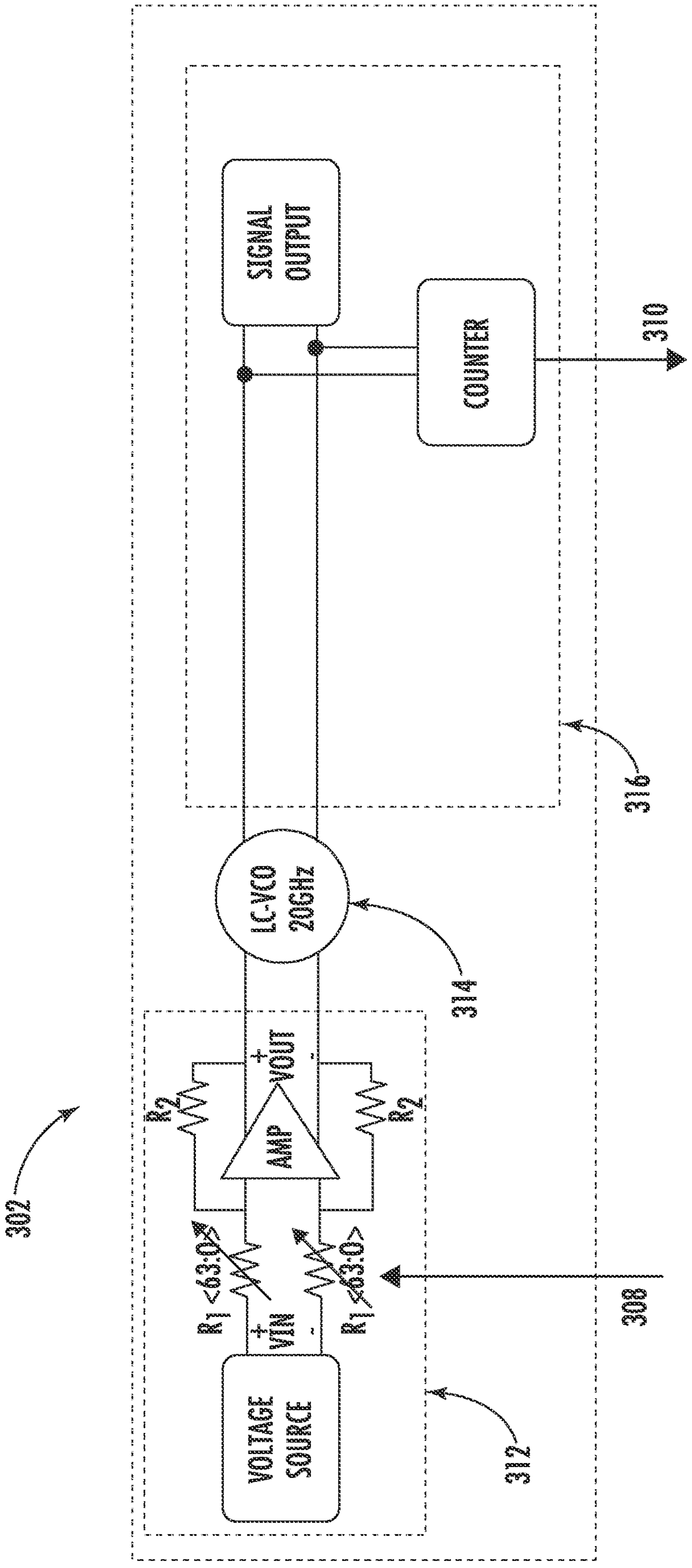
FIG. 3 illustrates a circuit level diagram of an analog component of a voltage-controlled oscillator in accordance with an example embodiment of the present disclosure.

Referring now to FIG. 3, a circuit level diagram of example VCO analog circuitry 302 of an example VCO device (e.g., VCO device 200) is provided. As depicted in FIG. 3, the example VCO analog circuitry 302 includes example voltage control circuitry 312 electrically connected to an example VCO 314 which is electrically connected to an example frequency counter 316.

As depicted in FIG. 3, the example VCO analog circuitry 302 receives an input signal, such as input data value 308. In some embodiments, the input data value 308 may be an analog signal, while in other embodiments, the input data value 308 may be a digital code which encounters a digital-to-analog converter (DAC), enabling the digital input signal to configure the electrical components controlling the input voltage to the VCO 314.

As further depicted in FIG. 3, the example voltage control circuitry 312 includes a voltage source, variable resistor, passive resistor elements, and an amplifier. The example components shown enable the voltage control circuitry 312 to modify the voltage provided to the VCO 314 based on the input data value 308. The electrical components as depicted in FIG. 3 may further comprise hardware, software, and/or firmware portions.

As further depicted in FIG. 3, the example VCO analog circuitry 302 includes an example VCO 314. As described in relation to FIG. 2, the VCO analog circuitry 302 may be any circuitry, module, component, or other similar device that generates an output signal with a frequency that varies based on an input voltage. As shown here, the input voltage may be controlled by voltage control circuitry, for example voltage control circuitry 312, which may be updated based on the input data value 308.

As further depicted in FIG. 3, the example VCO analog circuitry 302 includes an example frequency counter 316. As described in relation to FIG. 3, the frequency counter 316 may be any circuitry, module, component, or other similar device that monitors the frequency of the signal output generated by the VCO 314. As depicted in FIG. 3, the example frequency counter 316 includes a counter block attached to the output lines of the VCO 314. In some embodiments, the counter block may produce an analog output data value 310 representing the frequency of the signal output. In some embodiments, the counter block may produce a digital code as the output data value 310 which correspond to the frequency of the signal generated by the VCO 314.

Figure 4:
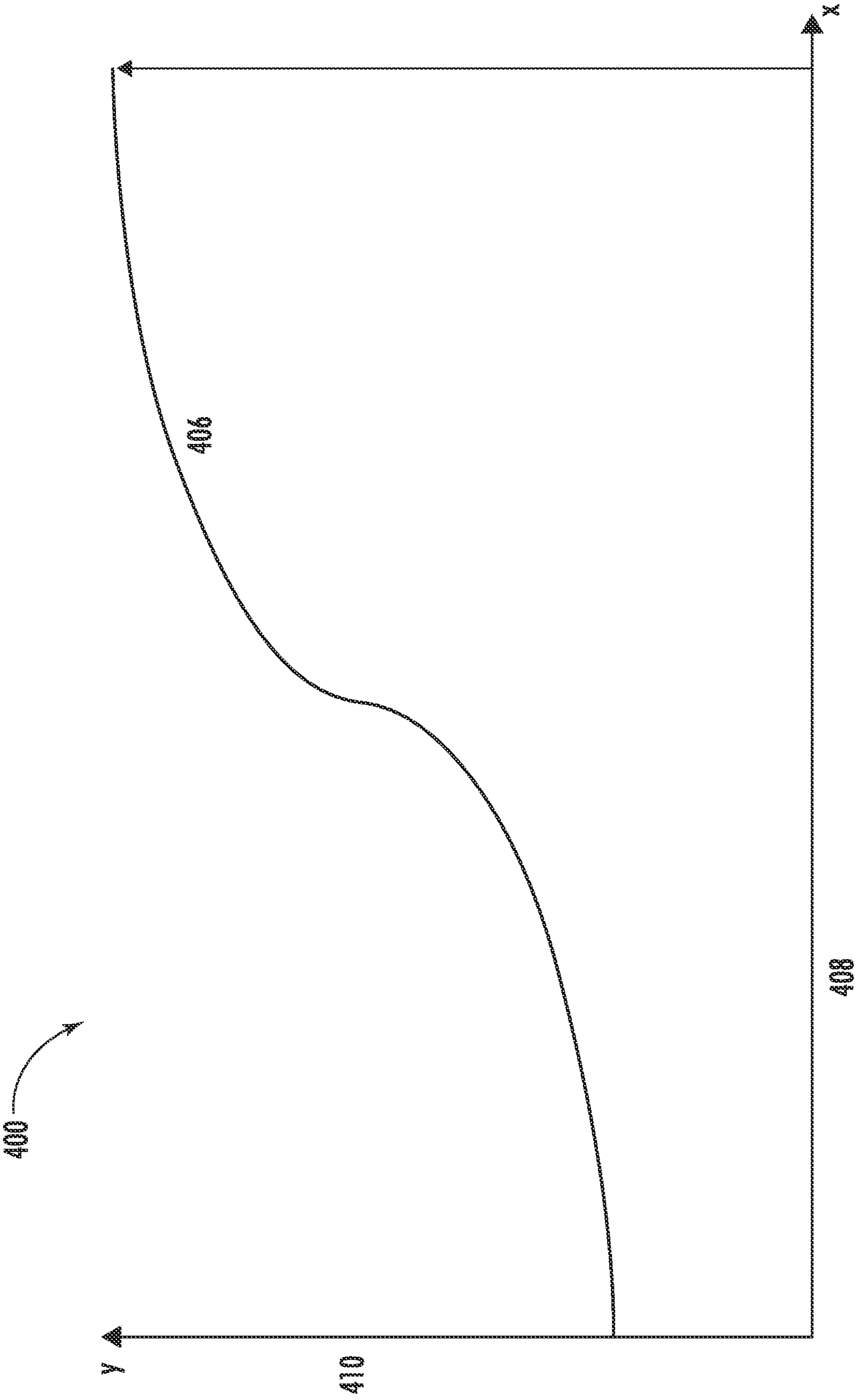
FIG. 4 illustrates a graph of an example data curve representing monotonically increasing proportional data in accordance with an example embodiment of the present disclosure.

Referring now to FIG. 4, an example proportional data graph 400 is shown. As depicted in FIG. 4, the example proportional data graph 400 comprises an example monotonic data curve 406 representing monotonically increasing data, such as data that may be stored in a memory device (e.g., memory device 106, LUT 206). As depicted in the example proportional data graph 400 of FIG. 4, the y-axis represents output data values 410, such as those output data values that may be returned from an electronic device (e.g., electronic device 102, VCO analog circuitry 202, VCO analog circuitry 302). As further depicted in the example proportional data graph 400, the x-axis represents input data values 408, such as those data values that may be transmitted to an electronic device (e.g., electronic device 102, VCO analog circuitry 202, VCO analog circuitry 302). For example, in some embodiments, the x-axis may represent a digital code used to configure the input voltage to a voltage-controlled oscillator (e.g., VCO 214, VCO 314). In such an embodiment, the y-axis may represent a digital code proportional to the frequency of the signal generated by the voltage-controlled oscillator. Although depicted as a continuous curve, in general, the monotonic data curve 406 of an electronic device (e.g., electronic device 102, VCO analog circuitry 202, VCO analog circuitry 302) may comprise a plurality of discrete points.

Figure 5:
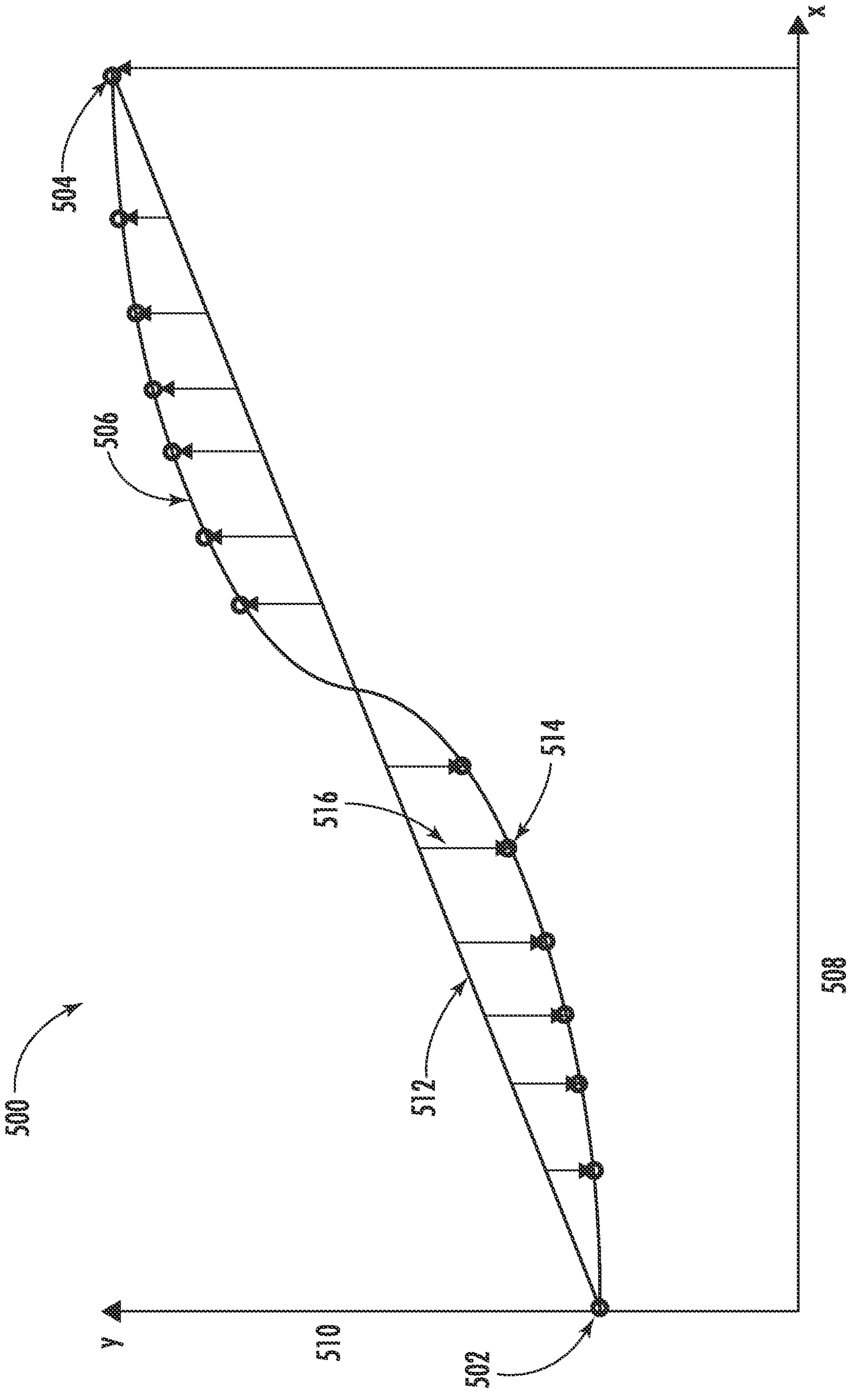
FIG. 5 illustrates a graph depicting example offsets from the linear estimate of the monotonically increasing proportional data in accordance with an example embodiment of the present disclosure.

Referring now to FIG. 5, an example proportional data graph 500, including a linear estimate 512 of the proportional data, is provided. As depicted in FIG. 5, proportional data may be any data for which a received output data value may be updated based on a transmitted input data value. For example, an input data value may be transmitted to a VCO, such as VCO 214 and VCO 314. The input data value may be proportional to an input voltage supplied to the VCO. The VCO may generate a signal having a frequency based on the input voltage supplied. The VCO may then transmit an output data value representing the frequency of the generated signal. Thus, the output data value is directly correlated with the input data value.

As further depicted in FIG. 5, proportional data may be represented on a graph. Each data point 514 represents a proportional data point. In the example proportional data graph 500, the x-axis represents input data values 508 and the y-axis represents output data values 510. Thus, each data point 514 is positioned on the proportional data graph 500 based on the ordered pair (input data value, output data value). The number of data points 514 may be equal to the number of unique input data values that may be provided to the electronic device (e.g., electronic device 102, VCO analog circuitry 202, VCO analog circuitry 302) and may represent data that may be stored in a memory device (e.g., memory device 106, LUT 206). For example, an electronic device may accept an input data value of 7 bits. In such an example, 128 unique input values may be provided, and 128 data points 514 may appear on the proportional data graph 500. The depicted data curve 506 is an approximation of the plurality of data points 514. In some embodiments, the proportional data may comprise monotonically increasing data, such that as the input data values 508 increase, the proportional output data values 510 never decrease.

As further depicted in FIG. 5, the proportional data may comprise a first data point 502 and a last data point 504. In some embodiments, the first data point 502 may be the data point 514 having the smallest and/or least significant input data value 508. For example, if the input data value 508 represents a digital code, the first data point 502 may be associated with the least significant input data value 508 (e.g., 0). As another example, if the input data value 508 represents the input voltage supplied to the VCO, the first data point 502 may be associated with the data point 514 having the lowest input voltage (e.g., −500 mV) of the set of valid input voltages. In contrast, the last data point may be the data point 514 having the largest and/or most significant input data value 508. For example, the last data point 514 may be associated with the most significant input data value (e.g., 127 in an instance in which the input data value 508 represents a seven bit digital code). Or, as another example, the last data point 514 may represent the highest input voltage (e.g., 500 mV) in an instance in which the input data value 508 represents an input voltage.

As further depicted in FIG. 5, an estimate of the proportional data may be determined, such as linear estimate 512. The linear estimate 512 may be determined based on a linear rate of change. The linear rate of change may be any slope, gradient, trend, tangent, or other numerical value approximating the change in the output data values 510 relative to the input data values 508. A linear rate of change may be determined using any method to approximate the change in output data values 510 with respect to input data values 508. For example, the linear rate of change may be determined by calculating the rate of change between any two given points in the proportional data. As another example, a best-fit line may be approximated or determined using averages, approximating methods, or a best-fit algorithm such as linear regression, least absolute deviations, and/or least squares fit, and the linear rate of change may be determined based on the slope of the best-fit line. In some embodiments, the linear rate of change may be determined by calculating the rate of change between the first data point 502 ($x_1$, $y_1$) and the last data point 504 ($x_2$, $y_2$), for example, as shown in Equation (1):

$$\text{Linear Rate of Change } ((x_1, y_1), (x_2, y_2)) = \frac{y_2 - y_1}{x_2 - x_1} \quad (1)$$

Such a method may be particularly advantageous with monotonic data because the calculation may be simple and fast, and the rate of change may be well suited for monotonically increasing data. For example, given a first data point 502 of (0, 19.69 GHz) where 0 is the input data value 508 representing the input digital code and 19.69 is the output data value 510 representing the frequency of the output data signal in gigahertz and a last data point 504 of (127, 20.5 GHz), the linear rate of change may be determined using Equation (1) as follows:

$$\text{Linear Rate of Change } ((0, 19.69), (127, 20.5)) = \frac{20.5 - 19.69}{127 - 0} = \frac{0.81}{127} = 0.006378$$

In addition to determining the linear rate of change, a linear estimate, such as linear estimate 512, may be determined. As depicted in FIG. 5, the linear estimate 512 may be any linear estimate of the plurality of data points 514 representing the output data values 510 relative to the input data values 508 for an electronic device. A linear estimate 512 may be approximated or determined using averages, approximating methods, determining the line between any plurality of data points 514, or by using a best-fit algorithm such as a linear regression, least absolute deviations, and/or least squares fit algorithm. In some embodiments, the linear estimate 512 may be represented by the line that passes through the first data point 502, representing the first input value and proportional first output value, and has a slope equivalent to the determined linear rate of change. In some embodiments, the linear estimate 512 may be determined by finding the line that passes through the first data point 502 and the last data point 504. The line that passes through the first data point and the last data point may be particularly useful when working with monotonic data. In an instance in which the linear estimate 512 is determined by finding the line that passes through the first data point 502 and the last data point 504, a controller (e.g., controller 104, controller 204) may only save the first output data value, and the linear rate of change, to determine an estimate for all other output data values 510 in the proportional data graph 500.

As further depicted in FIG. 5, the proportional data graph 500 illustrates a data point deviation 516 for each data point 514. A data point deviation 516 is the offset, divergence, or deviation of the output data value 510 of a particular data point 514 from the linear estimate 512. In some embodiments, the deviation of the output data value 510 may be determined and stored in a memory device (e.g., memory device 106, LUT 206), instead of the output data value 510 returned by the electronic device (e.g., electronic device 102, VCO analog circuitry 202, VCO analog circuitry 302). By determining a data point deviation 516 and storing the data point deviation 516 instead of the output data value 510 in the memory device, the overall size of the memory device may be reduced with no loss in the precision of the data.

For example, in many embodiments, the output data value 510 returned from the electronic device may be a 16-bit output digital code. In an instance in which the 16-bit output digital code is stored in a LUT, the LUT must be at least 16 bits wide to store the output digital code. Similarly, if the output data value 510 represents a frequency of a generated signal (e.g., 19.71551 GHz), 16, 32, or even 64 bits may be necessary to represent the precision of the output data value 510. However, for certain data sets, the data point deviation 516 may require significantly less bits to represent the necessary precision to store the data. For example, in an instance in which the output data values 510 may have a range anywhere from 0 to 50,000, then 16 bits will be necessary to store the data in a memory device. Suppose the output data values are in close proximity to the linear estimate 512, such that the maximum data point deviation 516 from the linear estimate 512 is 1000. In such an instance, only 10 bits are necessary to store the data point deviation 516, or perhaps 11 bits to account for a deviation of ±1000. This embodiment thus reduces the area necessary to store output data values 510 in a memory device. Considering an electronic system that may have multiple memory devices (e.g., a VCO device 200 may configure 16 bands and may have a LUT 206 for each band), the reduced area utilized by memory devices may be significant.

Figure 6:
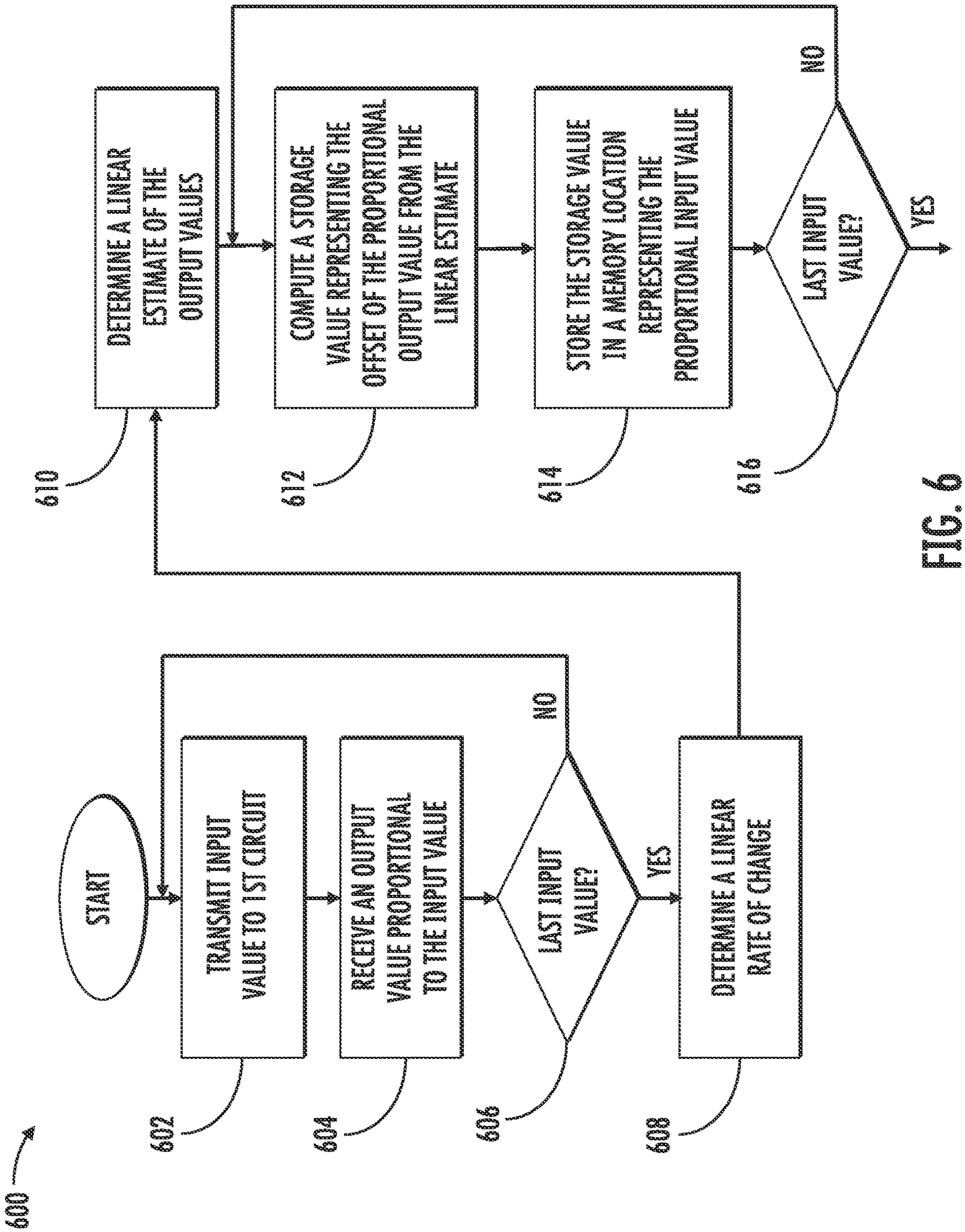
FIG. 6 depicts a flowchart illustrating an example method for storing data in a memory device in accordance with an example embodiment of the present disclosure.

Referring now to FIG. 6, an example flow diagram illustrating an example method 600 for storing proportional data from an electronic device (e.g., electronic device 102, VCO analog circuitry 202, VCO analog circuitry 302) is illustrated, in accordance with one or more embodiments of the present disclosure. As illustrated in step 602 of FIG. 6, a controller (e.g., controller 104, controller 204) transmits a first input value of a plurality of input values to a first circuit (e.g., electronic device 102, VCO analog circuitry 202, VCO analog circuitry 302), wherein the first circuit is configured to generate an output value (e.g., output data values 110, output data value 210, output data value 310) based at least in part on the input value (e.g., input data values 108, input data value 208, input data value 308). As described in relation to FIG. 1-FIG. 3, a first circuit may be any hardware, software, firmware, and/or a combination thereof, that receives one or more input data values and provides one or more output data values proportional to the input data values. A controller may perform steps to determine the proportional output value for each possible input value. For example, a controller may sweep through each input value as part of a configuration process, and transmit the input value to the first circuit. In some embodiments, the controller may only transmit a portion of the input values and may approximate other output values based on the received data. In some embodiments, the input value may be a digital code while in other embodiments, the input value may represent a physical value (e.g., input voltage).

At step 604, a controller receives an output value proportional to the input value. In some embodiments, the first circuit may measure and/or otherwise generate an output value proportional to, and/or correlated with, the input value provided. For example, in some embodiments, the first circuit may provide a digital code that represents an updated physical property of the first circuit. In some embodiments, the controller may be able to monitor and determine the output value proportional to the input value. For example, a controller may measure the frequency of a generated signal and correlate the measured frequency with a transmitted input value.

At step 606 the controller determines if all input values have been transmitted. In an instance in which all input values have not been transmitted to the electronic circuit, the process of transmitting an input value (step 602) and receiving the proportional output value (step 604) may continue. In an instance in which all the input values have been transmitted to the electronic circuit and the proportional output values have been received, the example method 600 may continue at step 608.

At step 608, the controller may determine a linear rate of change based at least in part on the change from the first input value to the second input value and on the change from a first output value proportional to the first input value to a second output value proportional to the second input value. As described in relation to FIG. 5, the controller may utilize a variety of methods to determine a the linear rate of change in the output values. In some embodiments, the controller may determine a linear rate of change by calculating the rate of change between any two given points in the proportional data. For example, the controller may determine the change in the output value by calculating the difference between the first output value and the second output value and divide this by the change in input value between the first input value and the second input value. The change in output value for a given change in input value may approximate a linear rate of change for the proportional data. In some embodiments, the controller may select the first data point (e.g., first data point 502) as the first input value, output value pair and the last data point (e.g., last data point 504) as the second input value, output value pair. The difference in output values divided by the difference in input values from the first data point to the last data point may be used to approximate the linear rate of change of the proportional data.

At step 610 a controller determines a linear estimate (e.g., linear estimate 512) of the plurality of output values based at least in part on the first output value and the linear rate of change. In some embodiments, the linear estimate may be the line having a slope equal to the linear rate of change and passing through the first data point used in the determination of the linear rate of change. In some embodiments, the linear estimate may be the line that passes through both the first data point (e.g., first data point 502) and the last data point (e.g., last data point 504) and may be represented, for example, as shown in Equation (2):

$$\text{Linear Estimate} = \text{Linear Rate of Change}\ ((x_1, y_1), (x_2, y_2)) \cdot (x) + y_0, \quad (2)$$

where $(x_1, y_1)$ is the first data point, $(x_2, y_2)$ is the last data point, and $y_0$ is the output value (projected or measured) when x is 0.

In some embodiments, the linear estimate may be a linear approximation of the proportional data determined using a fitting algorithm, such as a linear regression, least absolute deviations, and/or least squares fit algorithm.

At step 612 the controller computes a storage value representing the offset of the proportional output value from the linear estimate (e.g., data point deviation 516) for the correlated input value. The storage value may be determined based on the offset of a received output value from the linear estimate for the transmitted input value. In some embodiments, the offset from the linear estimate may be the value that is stored in the memory device for quick access during operation. Such a process may facilitate a reduction in the size of the memory device. In some embodiments, the storage value may be determined based on the offset of the received output value from the estimated output value as shown in example Equation (3) below. In addition, the estimated output value, given the input value x, may be determined based on the linear estimate, as shown in example Equation (4):

$$\text{Storage Value}\ (x) = \text{Output Value} - \text{Estimated Output Value}\ (x) \quad (3)$$

$$\text{Estimated Output Value}\ (x) = \text{Linear Rate of Change}\ ((x_1, y_1), (x_2, y_2)) \cdot (x) + y_0, \quad (4)$$

where x is the input value, $(x_1, y_1)$ is the first data point, $(x_2, y_2)$ is the second data point, and $y_0$ is the output value (projected or measured) when x=0.

For example, in an instance in which the first data point is the ordered pair (0, 39380) and the last data point is the ordered pair (127, 41000), and in an instance in which the first value in the ordered pair represents a digital code for an input value transmitted to the electronic device and the second value of the ordered pair represents a digital code for an output value received from the electronic device, the linear rate of change may be calculated by equation (1) as:

$$\text{Linear Rate of Change} = \frac{y_2 - y_1}{x_2 - x_1} = \frac{41000 - 39380}{127 - 0} = \frac{1620}{127} = 12.756.$$

Consequently, the linear estimate may be the line that passes through the point (0, 39380) and has a slope of 12.756 and may be represented by an equation such as Equation (2):

$$\text{Linear Estimate} = \text{Linear Rate of Change } ((x_1, y_1), (x_2, y_2)) \cdot (x) + y_0 = 12.756(x) + 39380.$$

Thus, in an instance in which an input value is transmitted to the electronic device (e.g., 40) and the output value is received (e.g., 39699), the estimated output value given an input value of 40 may be calculated as:

$$\text{Estimated Output Value } (40) = 12.756 * (40) + 39380 = 39890.$$

Further, the storage value for the input value of 40 may be calculated using, for example, Equation (3):

$$\text{Storage Value } (40) = 39699 - 39890 = -191$$

Thus, the offset value (e.g., data point deviation 516) of −191 may be stored in the memory device at the memory location correlated with the input value of 40, as opposed to the actual value 39699. During operation, in an instance in which the data value proportional to input value 40 is retrieved, the estimated output value is once again calculated (e.g., 39890) and the storage value is added to the estimated output value (e.g., 39890+(−191)) resulting in the output value initially received from the electronic device (e.g., 39699). By only storing the offset value, significant savings in memory size can be made with no negative impact on accuracy and the addition of only a minimal calculation.

In some embodiments, the controller may first transmit the input values associated with the two points used to determine the linear estimate. For example, the controller may first transmit the lowest input value, followed immediately by the highest input value. In such an embodiment, the controller may receive the output values associated with the first input value and the last input value and determine the linear estimate. Thus, as subsequent proportional values are received, the offset value may be determined and stored in the memory device.

At step 614 the controller stores the storage value in a memory (e.g., memory device 106, LUT 206) at a location representing the correlated input value. As described above, once the storage value is determined, the controller may write the storage value, as opposed to the received output value, at the memory location corresponding to the input value. In some embodiments, storing the offset value may provide significant area savings. For example, in an instance in which the output value may span a possible range of 50,000, 16 bits may be required to store the output value. However, if the offset value only spans a possible range of 500, only 9 bits are needed in each memory device.

At step 616 the controller determines whether all input values have been transmitted to the electronic device and received output values stored. In an instance in which there are more output values proportional to a given input value to be determined and stored, the method will return to step 612.

Figure 7:
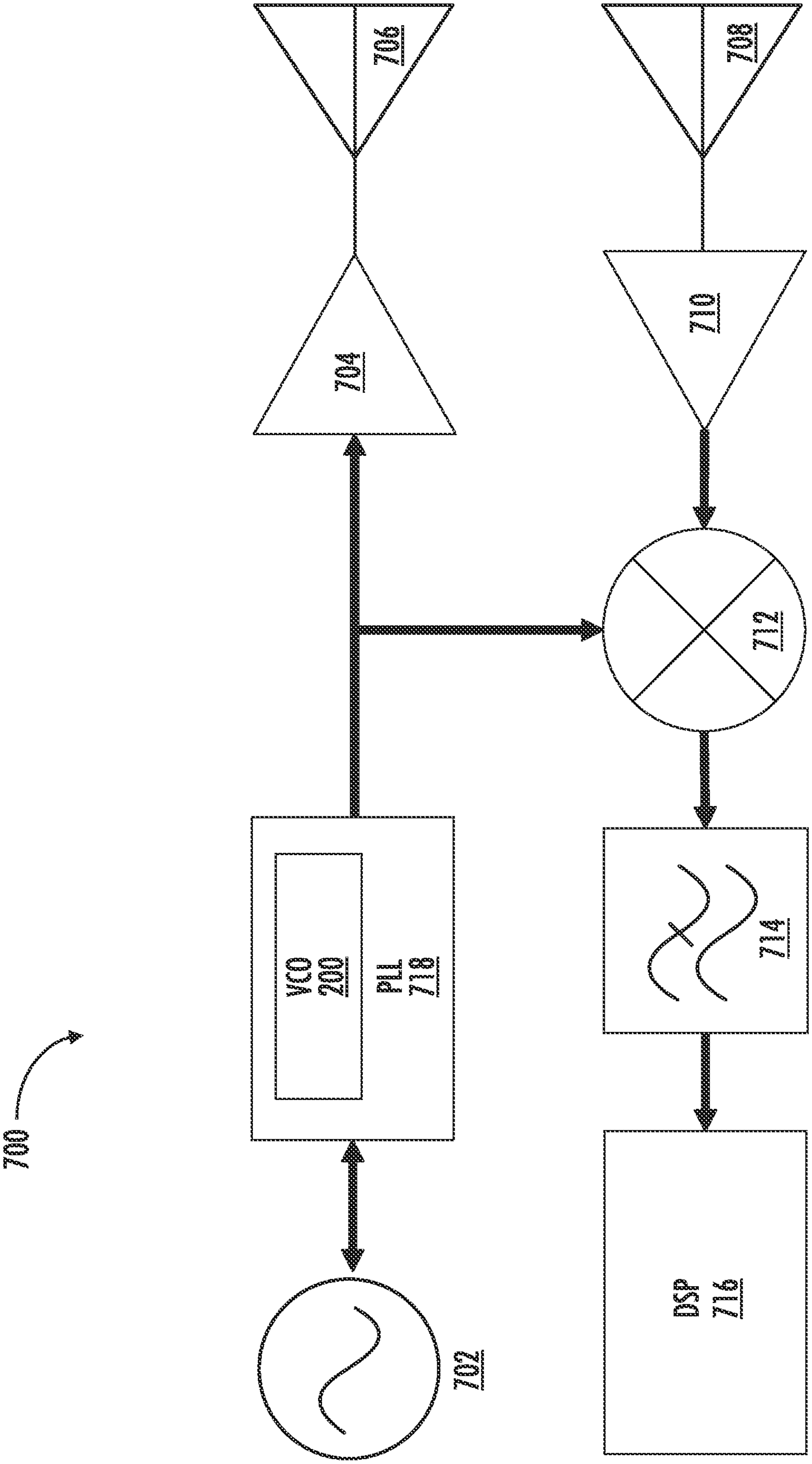
FIG. 7 illustrates a system level block diagram of a radar system including a PLL device comprising a voltage-controlled oscillator in accordance with an example embodiment of the present disclosure.

Referring now to FIG. 7, an example radar system 700 including a VCO device 200 in accordance with an example embodiment of the present disclosure is provided. As depicted in FIG. 7, the example radar system 700 includes a phase-locked loop (PLL) 718 utilizing a VCO device 200 and electrically connected to an oscillator 702. The PLL 718 is further electrically connected to a transmit amplifier 704 on the transmit portion of the radar system 700 and a mixer 712 on the receive portion of the radar system 700. In addition, the transmit amplifier 704 is electrically connected to a transmit antenna 706. The receiver portion of the radar system 700 includes a receive antenna 708 electrically connected to a low noise amplifier (LNA) 710 (e.g., receive amplifier), which is subsequently electrically connected to the mixer 712. On the receiver portion of the radar system 700, the mixer 712 is further electrically connected to a low-pass filter 714 which is in turn electrically connected to a digital signal processor (DSP) 716.

As depicted in FIG. 7, the example radar system 700 includes a PLL 718. A PLL 718 may, in some embodiments, compare the phase and frequency of the signal generated by a local oscillator (e.g., oscillator 702) with the phase and frequency of the signal generated by the PLL 718. The PLL 718 may adjust the output signal by manipulating the input voltage supplied to the VCO device 200. Once calibrated, the PLL 718 may determine the output frequency of the VCO device 200 by accessing a memory device (e.g., memory device 106, LUT 206). The PLL 718 may be used to generate high-frequency chirp signals that are subsequently amplified by the transmit amplifier 704 and transmitted via the transmit antenna 706.

The radar system 700 further includes a receive antenna 708 to receive the reflected chirp signal. The received signal may be amplified using an LNA 710 and mixed with the chirp signal generated by the PLL 718 and oscillator 702. The mixed signal may be filtered with a device such as a low-pass filter 714 (e.g., receive filter) and analyzed using a DSP 716 (e.g., processor). In some embodiments, the DSP 716 may determine characteristics of an object based on a comparison of the reflected chirp signal to the generated chirp signal, as evidenced in the mixed signal. Characteristics may include, the presence and/or movements of objects; the size, shape, and speed of objects; the material make-up of objects; and other similar characteristics.

While this detailed description has set forth some embodiments of the present invention, the appended claims cover other embodiments of the present invention which differ from the described embodiments according to various modifications and improvements. For example, one skilled in the art may recognize that such principles may be applied to any electronic device that utilizes proportional data, particularly monotonic proportional data. For example, an electronic device that determines the capacitance of a variable capacitor based on the angle of the rotors, or a voltage-controlled motor, wherein the rotational speed of the motor varies based on the input voltage, or a photodiode, wherein the output current of the photodiode varies based on the intensity of the light.

Within the appended claims, unless the specific term "means for" or "step for" is used within a given claim, it is not intended that the claim be interpreted under 35 U.S.C. 112, paragraph 6.

Use of broader terms such as "comprises," "includes," and "having" should be understood to provide support for narrower terms such as "consisting of," "consisting essentially of," and "comprised substantially of" Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

The invention claimed is:

1. An apparatus comprising:
a look-up table; and
a controller configured to:
determine, at a first circuit, a plurality of output values directly correlated with a plurality of input values, wherein the plurality of output values change based on the plurality of input values, and
wherein the plurality of input values comprise at least a first input value correlated to a first output value of the plurality of output values and a second input value correlated to a second output value of the plurality of output values;
generate a linear estimate comprising a linear rate of change, wherein the linear rate of change is determined based at least in part on an input change from the first input value to the second input value and on an output change from the first output value to the second output value;
generate a storage value for each of the plurality of output values directly correlated with the plurality of input values, wherein the storage value of each of the plurality of output values is based on an offset of each of the plurality of output values from the linear estimate; and
store the storage value for each of the plurality of output values in the look-up table in association with the correlated plurality of input values.

2. The apparatus of claim 1, wherein the first circuit comprises a voltage-controlled oscillator and the plurality of input values correspond to a plurality of input voltages.

3. The apparatus of claim 2, wherein the voltage-controlled oscillator is further configured to generate an output signal comprising an output frequency, and wherein the plurality of output values are proportional to the output frequency of the output signal.

4. The apparatus of claim 2, wherein the first input value corresponds to a lowest input value of the plurality of input values comprising a lowest input voltage, and the second input value corresponds to a highest input value of the plurality of input values comprising a highest input voltage.

5. The apparatus of claim 1, wherein the plurality of output values monotonically increase as the plurality of input values increase.

6. The apparatus of claim 1, wherein the linear estimate comprises a line that passes through a point representing the first input value and correlated first output value and comprising a slope correlated to the linear rate of change.

7. The apparatus of claim 1, wherein a first number of bits required to store the storage value is less than a second number of bits required to store an associated output value.

8. A method, comprising:
for each input value in a plurality of input values comprising at least a first input value and a second input value, determining a plurality of output values directly correlated with the plurality of input values, wherein the plurality of output values change based on the plurality of input values, and wherein the plurality of output values comprise at least a first output value of the plurality of output values correlated with the first input value, and a second output value of the plurality of output values correlated with the second input value, by:

(1) transmitting the input value to a first circuit, wherein the first circuit is configured to generate an output value based at least in part on the input value, and
(2) receiving an output value based on the input value;
generating a linear estimate comprising a linear rate of change, wherein the linear rate of change is determined based at least in part on an input change from the first input value to the second input value and on an output change from the first output value to the second output value; and
for each output value in the plurality of output values:
generating a storage value based on an offset of the output value from the linear estimate, and
storing the storage value in a look-up table in association with a respective correlated input value.

9. The method of claim 8, wherein the first circuit comprises a voltage-controlled oscillator and the plurality of input values correspond to a plurality of input voltages.

10. The method of claim 9, wherein the voltage-controlled oscillator is further configured to generate an output signal comprising an output frequency, and wherein the plurality of output values correlate to the output frequency of the output signal.

11. The method of claim 9, wherein the first input value corresponds to a lowest input value of the plurality of input values comprising a lowest input voltage, and the second input value corresponds to a highest input value of the plurality of input values comprising a highest input voltage.

12. The method of claim 8, wherein the plurality of output values monotonically increase as the plurality of input values increase.

13. The method of claim 8, wherein the linear estimate comprises a line that passes through the first input value and correlated first output value with a slope correlated to the linear rate of change.

14. The method of claim 8, wherein a first number of bits required to store the storage value is less than a second number of bits required to store an associated output value.

15. A radar system comprising:
a phase-locked loop comprising:
a first circuit configured to receive an input value and generate an output value that changes based on the input value;
a look-up table; and
a controller, configured to:
determine, at the first circuit, a plurality of output values directly correlated with a plurality of input values, wherein the plurality of input values comprise at least a first input value correlated to a first output value of the plurality of output values and a second input value correlated to a second output value of the plurality of output values;
generate a linear estimate comprising a linear rate of change, wherein the linear rate of change is determined based at least in part on an input change from the first input value to the second input value and on an output change from the first output value to the second output value;
generate a storage value for each of the plurality of output values directly correlated with the plurality of input values, wherein the storage value of each of the plurality of output values is based on an offset of each of the plurality of output values from the linear estimate; and store the storage value for each of the plurality of output values in the look-up table in association with the correlated plurality of input values.

16. The radar system of claim 15, further comprising:

a local oscillator electrically connected to the phase-locked loop, wherein the phase-locked loop generates an output signal based at least in part on a reference signal generated by the local oscillator;

a transmit amplifier electrically connected to the phase-locked loop, wherein the transmit amplifier generates an amplified output signal based at least in part on the output signal;

a transmit antenna electrically connected to the transmit amplifier, wherein the transmit antenna transmits a transmitted signal based at least in part on the amplified output signal;

a receive antenna configured to receive a reflected signal resulting from one or more objects encountered by the transmitted signal;

a receive amplifier electrically connected to the receive antenna, wherein the receive amplifier is configured to generate an amplified receive signal based at least in part on the reflected signal;

a mixer electrically connected to the phase-locked loop and the receive amplifier, wherein the mixer is configured to produce a mixed signal based at least in part on the output signal and the amplified receive signal;

a receive filter electrically connected to the mixer, wherein the receive filter is configured to generate a filtered signal based at least in part on the mixed signal; and a processor electrically connected to the receive filter, wherein the processor determines one or more characteristics of the one or more objects based at least in part on the filtered signal.

17. The radar system of claim 15, wherein the first circuit comprises a voltage-controlled oscillator and the plurality of input values correspond to a plurality of input voltages.

18. The radar system of claim 17, wherein the voltage-controlled oscillator is further configured to generate an output signal comprising an output frequency, and wherein the plurality of output values are proportional to the output frequency of the output signal.

19. The radar system of claim 17, wherein the first input value corresponds to a lowest input voltage value of the plurality of input values, and the second input value corresponds to a highest input voltage value of the plurality of input values.

20. The radar system of claim 15, wherein the linear estimate comprises a line that passes through a point representing the first input value and correlated first output value and comprising a slope correlated to the linear rate of change.

* * * * *